United States Patent [19]

Hwang

[11] Patent Number: 5,778,101

[45] Date of Patent: *Jul. 7, 1998

[54] METHOD AND APPARATUS FOR PROCESSING AN IMAGE SIGNAL HAVING AN OBJECT BY USING AN EXTENSION-INTERPOLATION TECHNIQUE

[75] Inventor: Duck-Dong Hwang, Seoul, Rep. of Korea

[73] Assignee: Daewoo Electronics Co., Ltd., Seoul, Rep. of Korea

[*] Notice: The term of this patent shall not extend beyond the expiration date of Pat. No. 5,633,685.

[21] Appl. No.: 629,172

[22] Filed: Apr. 8, 1996

[51] Int. Cl.$^6$ .............. G06K 9/36; G06K 9/46; G06K 9/32

[52] U.S. Cl. .............. 382/250; 358/428; 358/433; 382/277; 382/300

[58] Field of Search .............. 382/242, 248, 382/250, 277, 281, 298, 299, 300; 358/428, 432, 433, 464, 467; 348/403, 404

[56] References Cited

U.S. PATENT DOCUMENTS

| | | | |
|---|---|---|---|
| 3,987,412 | 10/1976 | Morrin, II | 382/242 |
| 4,661,987 | 4/1987 | Anderson et al. | 382/277 |
| 5,216,516 | 6/1993 | Tanaka et al. | 358/426 |
| 5,227,875 | 7/1993 | Suu et al. | 348/384 |
| 5,495,244 | 2/1996 | Je-Chang et al. | 348/404 |
| 5,633,685 | 5/1997 | Cho et al. | 382/242 |

Primary Examiner—Joseph Mancuso
Assistant Examiner—Timothy M. Johnson

[57] ABSTRACT

A processing block is processed by using an extension-interpolation ("E-I") technique, wherein the processing block consists of N×N pixels which are classified into object pixels and background pixels and the E-I procedure comprises the steps of: selecting L rows of the processing block, each having at least one object pixels; for each selected row, determining M representing a number of object pixels included therein and providing a first vector representing the M object pixels; for each first vector, selecting an extension matrix among a multiplicity of predetermined extension matrices based on the M and N values and multiplying the selected extension matrix to the first vector to provide an extended first vector; providing a first extended processing block which includes L rows, each row representing each of the extended first vectors; for each column of the first extended processing block, providing a corresponding L-dimensional second vector; selecting an extension matrix based on the L and N values; multiplying the selected extension matrix to each of the second vectors, to provide extended second processing block; and multiplying a block scaling factor to each pixels of the second extended processing block, to thereby provide the extended processing block.

5 Claims, 5 Drawing Sheets

METHOD AND APPARATUS FOR PROCESSING AN IMAGE SIGNAL HAVING AN OBJECT BY USING AN EXTENSION-INTERPOLATION TECHNIQUE

FIELD OF THE INVENTION

The present invention relates to a method and an apparatus for processing an image signal at a low bit-rate; and, more particularly, to a method and an apparatus for encoding an image signal having an object through the use of an extension-interpolation ("E-I") technique.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of digital data through the fixed channel, a video signal encoding method is normally used to compress the digital data.

One of such methods for encoding image signals for a low bit-rate encoding system is the so-called object-oriented analysis-synthesis coding technique (see Michael Hotter, "Object-Oriented Analysis-Synthesis Coding Based on Moving Two-Dimensional Objects", *Signal Processing: Image Communication*, 2,409-428(1990)).

According to the object-oriented analysis-synthesis coding technique, an input image signal, which has moving objects, is divided into the objects; and three sets of parameters for defining motion, contour and pixel data of each object are processed through different encoding channels.

In case of processing image data or pixels lying within an object, a transform coding technique for reducing the spatial redundancies contained in the image data may be mainly employed in the object-oriented analysis-synthesis coding technique. One of the most frequently used transform coding techniques for image data compression is a DCT(discrete cosine transform) based block transformation coding, which converts a block of digital image data, for example, a block of 8×8 pixels, into a set of transform coefficient data. This method is described in, e.g., Chen and Pratt, "Scene Adaptive Coder", *IEEE Transactions on Communications*, COM-32, No. 3, pp. 225-232 (March 1984). Though they have not been adopted as frequently as the DCT, a DST(Discrete Sine Transform), a Hartley transform or other transforms may be used in connection with the block transform coding.

Figure 1A:
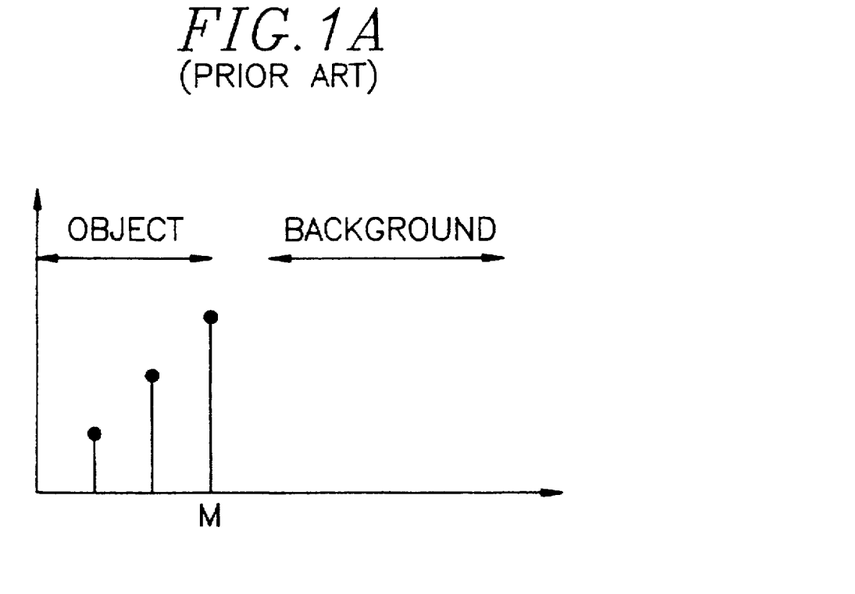
FIGS. 1A to 1D represent different methods for filling a background region.
Figure 1B:
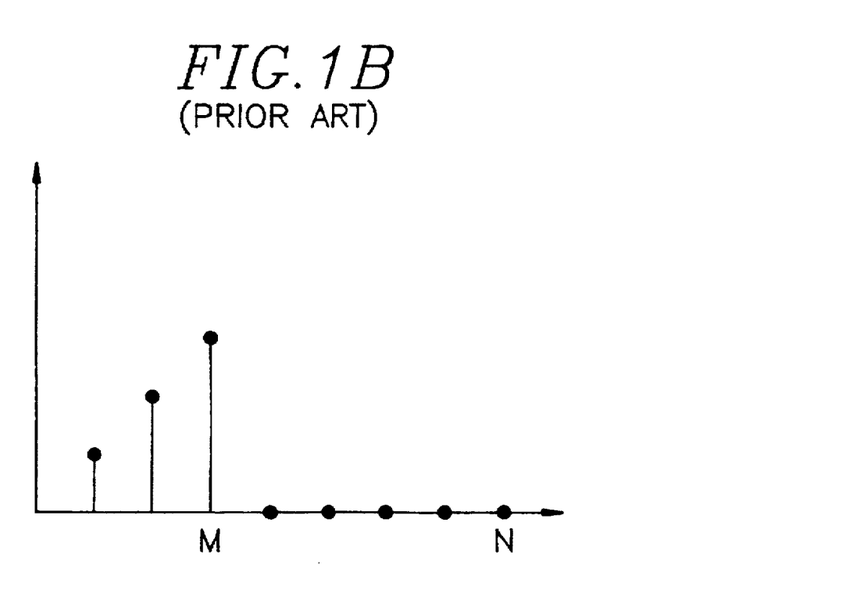
Figure 1C:
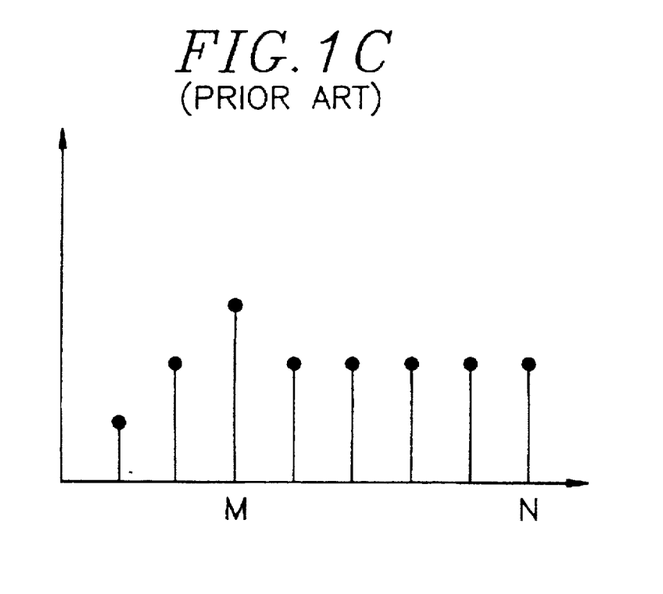
Figure 1D:
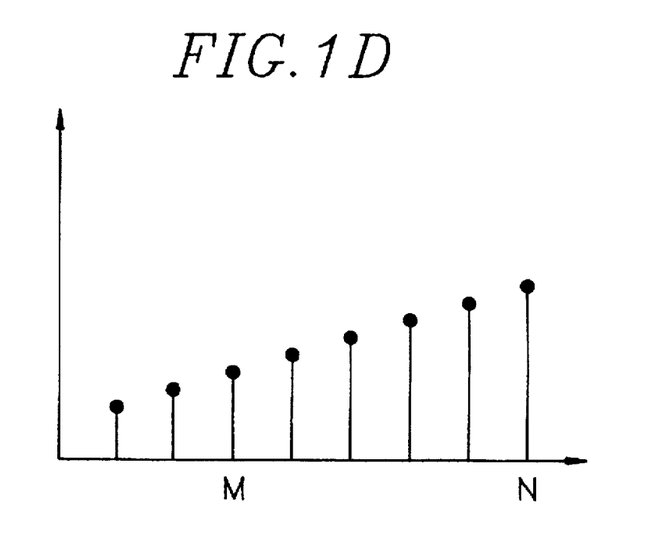

In the block transformation coding, a background or non-object region within a block is filled with, e.g., 0, an average pixel value or a mirror image of the object in the block, and then transformation is carried out. Referring to FIGS. 1B and 1C, conventional methods for filling the background region are illustrated for a case of 1-dimension data. Specifically, in FIG. 1B, the background region is filled with 0; and in FIG. 1C, the background region is filled with an average pixel value in the object region.

Even though these methods have the advantage of being able to utilize two-dimensional DCT blocks used in conventional methods (such as Joint Photographic Experts Group: JPEG, Moving Pictures Experts Group: MPEG, H.261 etc.), it also includes unnecessary or undesired data in the background region of the image, and is, therefore, inefficient from a data compression point of view.

SUMMARY OF THE INVENTION

It is, therefore, a primary object of the present invention to provide a method for effectively encoding an image frame signal having an object using an extension-interpolation technique, thereby improving the data compression efficiency thereof.

In accordance with the present invention, there is provided a method for converting a processing block included in an image frame signal having an object to an extended processing block, wherein the processing block consisting of N×N pixels which are classified into object pixels and background pixels, N being a positive integer, the object pixels being located within the object and the background pixels being located outside the object, comparing the steps of:

(A) counting the number of the object pixels in the processing block;

(B) selecting L rows of the processing block, each of the L rows having at least one object pixels, L being an integer ranging from 0 to N;

(C) for each row selected at step (A), for determining M representing a number of object pixels included in said each row and providing a first vector, each element of the first vector being a value of each of the M object pixels, M being an integer ranging from 1 to N;

(D) for each first vector, selecting an extension matrix among a multiplicity of predetermined extension matrices, based on the M and N values and multiplying the selected extension matrix to the first vector to provide an extended first vector;

(E) providing a first extended processing block which includes L rows, each row having N pixels whose values are elements of each of the extended first vectors;

(F) for each column of the first extended processing block, providing an L-dimensional second vector, elements of the second vector being values of pixels included in said each column of the first extended processing block;

(G) selecting an extension matrix among a multiplicity of the predetermined extension matrices based on the L and N values;

(H) multiplying the extension matrix selected at step (G) to each of the second vectors, to provide N extended second vectors and to thereby provide second extended processing block which includes N columns, each column having N pixels whose values are elements of each of the extended second vectors;

(I) determining a block scaling factor which is the number of the object pixels divided by the number of pixels in the processing block; and (J) multiplying the block scaling factor to each pixels of the second extended processing block, to thereby provide the extended block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2A:
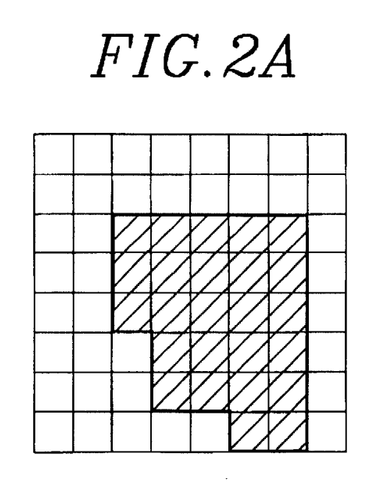
FIGS. 2A to 2C show the extension-interpolation technique of the present invention.
Figure 2B:
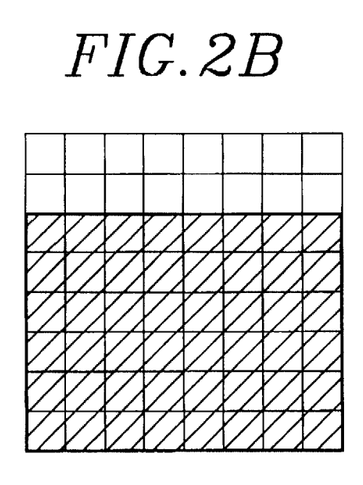
Figure 2C:
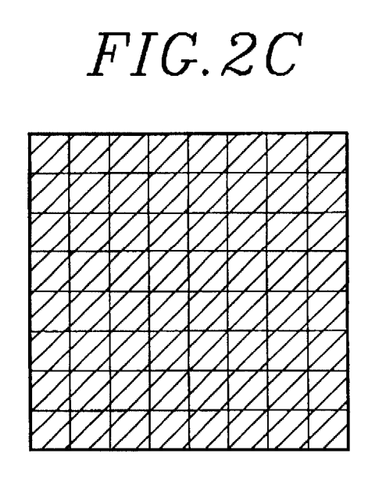

Referring to FIG. 2A, there is shown a block of digital image signal which includes 8×8 pixels, each of them being denoted by a square. The block contains an object region which is represented by shaded pixels and a remaining background region. The shaded pixels are called as object pixels while the other pixels are called as background pixels. The object pixels are extended to fill the entire block as shown in FIGS. 2B and 2C by using the extension-interpolation ("E–I") technique of the present invention. To achieve this, a horizontal and a vertical extensions are performed separately as shown in FIGS. 2B and 2C, respectively. Either the horizontal or the vertical extension is performed prior to the other and the priority may be decided according to image characteristics. The horizontal or the vertical extension may be performed row-by-row or column-by-column. In case that a block includes N×N pixels, for each row or each column, M-dimensional ("M-D") vector, M being an integer ranging from 1 to N, is converted to N-dimensional ("N-D") vector, wherein elements of the M-D vector are M object pixel values included in each row or each column, and elements of the N-D vector are N extended pixel values. For example, in case of the third row of the block shown in FIG. 2A, a 5-dimensional vector is converted to an 8-dimensional vector representing the third row of a horizontally extended block shown in FIG. 2B.

A transformed M-D vector $F_1$ obtained by applying M-point 1-D DCT to the M-D vector $f_1$ are represented as follows:

$$\begin{pmatrix} F_1(0) \\ F_1(1) \\ \cdot \\ \cdot \\ F_1(M-1) \end{pmatrix} = \begin{pmatrix} b_{00} & b_{01} & \cdots & b_{0(M-1)} \\ b_{10} & b_{11} & \cdots & b_{1(M-1)} \\ \cdot & \cdot & & \cdot \\ \cdot & \cdot & & \cdot \\ b_{(M-1)0} & b_{(M-1)1} & \cdots & b_{(M-1)(M-1)} \end{pmatrix} \begin{pmatrix} f_1(0) \\ f_1(1) \\ \cdot \\ \cdot \\ f_1(M-1) \end{pmatrix}$$

Eq. (1)

wherein $f_1(n_1)$ is $n_1$th element of $f_1$; $F_1(k_1)$ is $k_1$th element of $F_1$; $n_1$ and $k_1$ are integers ranging from 0 to M−1; and $b_{ij}$ is represented as:

$$\sqrt{\frac{1}{M}} \quad \text{for } i = 0$$

$$\sqrt{\frac{2}{M}} \cos\left[ \frac{\pi(2j+1)i}{2M} \right] \text{ for } i \neq 0$$

Similarly, when the M-D vector $f_1$ is extended to form an N-D vector $f_2$ by using the E-I technique of the present invention, a transformed N-D vector $F_2$ obtained by applying N-point 1-D DCT to the N-D vector $f_2$ is represented as follows:

$$\begin{pmatrix} F_2(0) \\ F_2(1) \\ \cdot \\ \cdot \\ F_2(M-1) \\ \cdot \\ \cdot \\ F_2(N-1) \end{pmatrix} = \begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & & \cdot & & \cdot \\ \cdot & \cdot & & \cdot & & \cdot \\ a_{(M-1)0} & a_{(M-1)1} & \cdots & a_{(M-1)(M-1)} & \cdots & a_{(M-1)(N-1)} \\ \cdot & \cdot & & \cdot & & \cdot \\ \cdot & \cdot & & \cdot & & \cdot \\ a_{(N-1)0} & a_{(N-1)1} & \cdots & a_{(N-1)(M-1)} & \cdots & a_{(N-1)(N-1)} \end{pmatrix} \begin{pmatrix} f_2(0) \\ f_2(1) \\ \cdot \\ \cdot \\ f_2(M-1) \\ \cdot \\ \cdot \\ f_2(N-1) \end{pmatrix}$$

Eq. (2)

wherein $f_2(n_2)$ is $n_2$th element of $f_2$; $F_2(k_2)$ is $k_2$th element of $F_2$; $n_2$ and $k_2$ are integers ranging from 0 to N−1; and $a_{ij}$ is represented as $$\sqrt{\frac{1}{N}} \quad \text{for } i = 0$$

$$\sqrt{\frac{2}{N}} \cos\left[ \frac{\pi(2j+1)i}{2N} \right] \text{ for } i \neq 0.$$

In accordance with the E-I method of the present invention, the M-D vector $f_1$ is extended to N-D vector $f_2$ without generating any additional frequency domain data. That is, the following equation is satisfied:

$$\begin{pmatrix} F_2(0) \\ F_2(1) \\ \cdot \\ \cdot \\ F_2(M-1) \\ F_2(M) \\ \cdot \\ \cdot \\ F_2(N-1) \end{pmatrix} = \begin{pmatrix} \mu_0 F_1(0) \\ F_1(1) \\ \cdot \\ \cdot \\ F_1(M-1) \\ 0 \\ \cdot \\ \cdot \\ 0 \end{pmatrix}$$

Eq. (3)

wherein $\mu_0$ is a scaling factor used to make the DC component of $f_2$ equal to that of $f_1$ and is given as, $$\mu_0 = \sqrt{\frac{N}{M}}$$

When Eq. (3) is satisfied, the E-I method is optimal because no additional data is generated in the frequency domain while $f_1$ is converted to $f_2$.

From Eqs. (1) and (2), it can be deduced that $f_2$ is obtained from $f_1$ as follows:

$$\begin{pmatrix} f_2(0) \\ f_2(1) \\ \cdot \\ \cdot \\ f_2(M-1) \\ \cdot \\ \cdot \\ f_2(N-1) \end{pmatrix} = \begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & & \cdot & & \cdot \\ \cdot & \cdot & & \cdot & & \cdot \\ a_{(M-1)0} & a_{(M-1)1} & \cdots & a_{(M-1)(M-1)} & \cdots & a_{(M-1)(N-1)} \\ \cdot & \cdot & & \cdot & & \cdot \\ \cdot & \cdot & & \cdot & & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & & \cdot \\ \cdot & \cdot & & \cdot \\ b_{(M-1)0} & b_{(M-1)1} & \cdots & b_{(M-1)(M-1)} \\ 0 & 0 & \cdots & 0 \\ \cdot & \cdot & & \cdot \\ \cdot & \cdot & & \cdot \\ 0 & 0 & \cdots & 0 \end{pmatrix} \cdot \begin{pmatrix} f_1(0) \\ f_1(1) \\ \cdot \\ \cdot \\ f_1(M-1) \end{pmatrix}$$

Eq. (4A)

or $$f_2 = A^{-1} B f_1$$  Eq. (4B)

wherein A and B denote the N×N and N×M matrices whose components are $a_{ij}$ and $b_{ij}$ used in Eq. (4A), respectively. Eqs. (4A) and (4B) are further simplified as follows:

$$\begin{pmatrix} f_2(0) \\ f_2(1) \\ \cdot \\ \cdot \\ f_2(N-1) \end{pmatrix} = \begin{pmatrix} c_{00} & c_{01} & \cdots & c_{0(M-1)} \\ c_{10} & c_{11} & \cdots & c_{1(M-1)} \\ \cdot & \cdot & & \cdot \\ \cdot & \cdot & & \cdot \\ c_{(N-1)0} & c_{(N-1)1} & \cdots & c_{(N-1)(M-1)} \end{pmatrix} \cdot \begin{pmatrix} f_1(0) \\ f_1(1) \\ \cdot \\ \cdot \\ f_1(M-1) \end{pmatrix}$$

Eq. (5A)

$$f_2 = C f_1$$  Eq. (5B)

wherein C is an N×M matrix and equal to $A^{-1}B$.

By using the above relationship, an arbitrary shaped object is extended to fill an N×N block without generating additional frequency domain elements.

Conversely, the original data of FIG. 2A is recovered from the extended processing block shown in FIG. 2C.

In case N is identical to M, C is an identity matrix. Therefore, the extension procedure dosen't change the original vector $f_1$ and can be ommitted.

In the example depicted in FIGS. 2A to 2C, third to eighth rows of the block shown in FIG. 2A are first horizontally extended by using the E-I method of the present invention to those of the block shown in FIG. 2B. Similarly, columns of the horizontally extended block shown in FIG. 2B are vertically extended by using the E-I method to those of the extended block shown in FIG. 2C.

Up to now, the E-I method of the present invention is explained in case of the DCT. However, other transforms, e.g., the DST (Discrete Sine Transform), the Hadamard transform, the Haar transform, and the like may be used instead. When the DST is used in encoding the N×N block, the E-I method is identical to the case of DCT except that $a_{ij}$ and $b_{ij}$ are represented as:

$$\sqrt{\frac{2}{N+1}} \sin\left[\frac{\pi(j+1)(i+1)}{N+1}\right]$$

and $$\sqrt{\frac{2}{M+1}} \sin\left[\frac{\pi(j+1)(i+1)}{M+1}\right],$$

respectively.

It is known that when image data is not highly correlated in a spatial domain, for example, in case of an inter frame coding wherein difference between two adjacent frames are coded, the DST based block transform coding may result in a better performance than the DCT based coding.

In the method explained above, the scaling factor $\mu_0$ is applied only to the DC component of the frequency domain. However, it may be advantageous to apply the scaling factor $\mu_0$ to other components as well. To achieve this, Eq. (4A) is modified as follows:

Eq. (4A')

$$\begin{pmatrix} f_2(0) \\ f_2(1) \\ \cdot \\ \cdot \\ f_2(M-1) \\ \cdot \\ \cdot \\ f_2(N-1) \end{pmatrix} =$$

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \vdots & \vdots & & \vdots & & \vdots \\ a_{(M-1)0} & a_{(M-1)1} & \cdots & a_{(M-1)(M-1)} & \cdots & a_{(M-1)(N-1)} \\ \vdots & \vdots & & \vdots & & \vdots \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ \mu_0 b_{10} & \mu_0 b_{11} & \cdots & \mu_0 b_{1(M-1)} \\ \vdots & \vdots & & \vdots \\ \mu_0 b_{(M-1)0} & \mu_0 b_{(M-1)1} & \cdots & \mu_0 b_{(M-1)(M-1)} \\ 0 & 0 & \cdots & 0 \\ \vdots & \vdots & & \vdots \\ 0 & 0 & \cdots & 0 \end{pmatrix} \cdot \begin{pmatrix} f_1(0) \\ f_1(1) \\ \vdots \\ f_1(M-1) \end{pmatrix}$$

In this case, total energy contained in the processing block increased substantially during the extension procedure. To alleviate the effect of the energy increase, a block scaling factor is multiplied to each pixel value of the extended processing block, wherein the block scaling factor is defined as the number of object pixels in a processing block divided by N×N, i.e., the number of pixels in the processing block.

Figure 3:
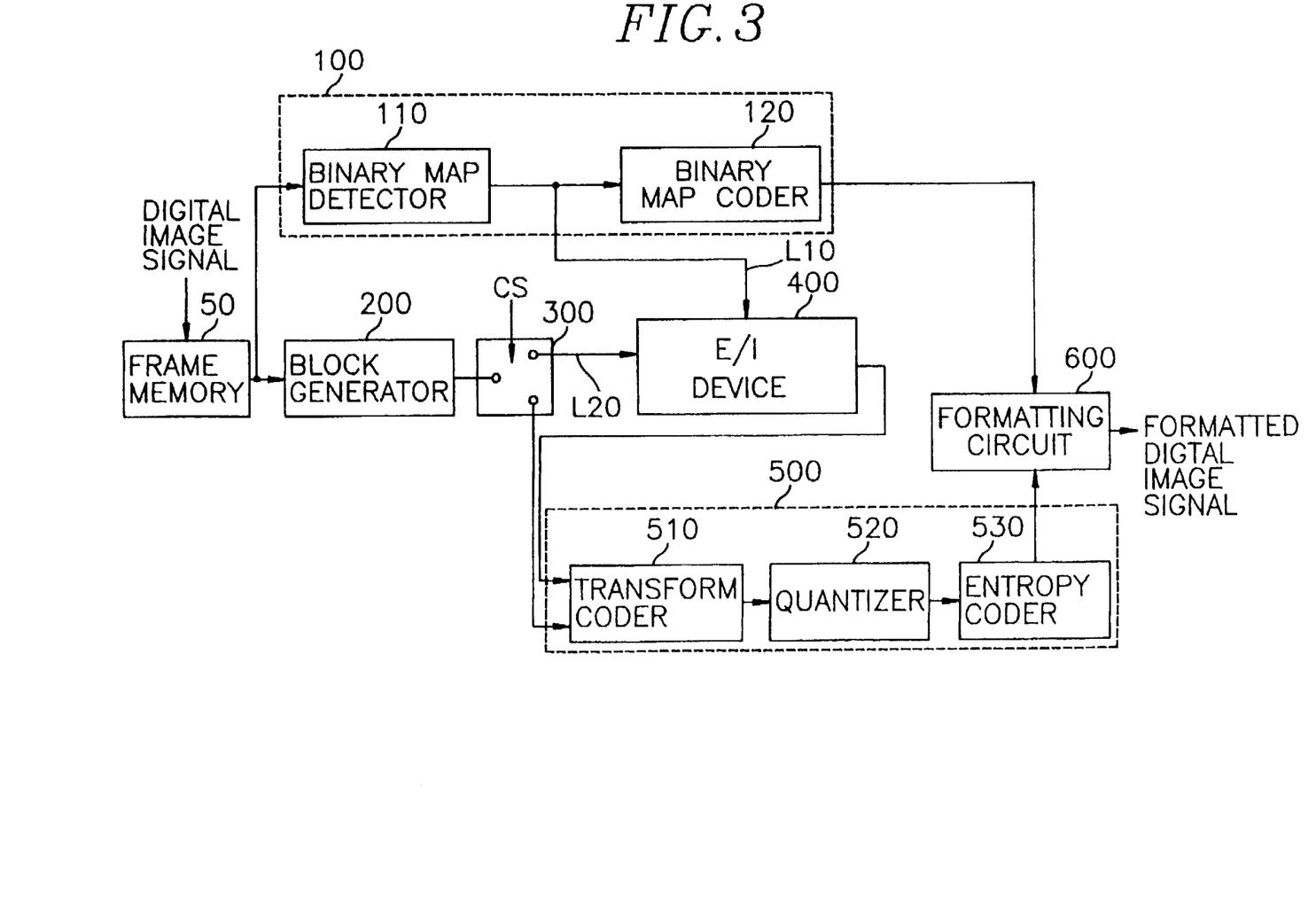
FIG. 3 provides a block diagram illustrating an image signal encoding apparatus in accordance with the present invention.

Referring to FIG. 3, there is shown a block diagram of an apparatus for encoding a digital image signal in accordance with the present invention. The encoding apparatus 10 comprises a first and a second encoding channels 100 and 500, and an Extension/Interpolation ("E/I") device 400 for producing extended processing blocks in order to effectively encode a portion of a boundary of an object in the image signal, wherein the first encoding channel 100 serves to encode a binary map of the object and the second encoding channel 500 operates to encode the digital image signal on a block-by-block basis.

The digital image signal, which is generated from a known image source(not shown), e.g., a hard disk or a compact disk, is inputted to a frame memory 50 for the storage thereof. A frame of the digital image signal has an object and includes object pixels which are located within the object and background pixels which are located outside thereof. The background pixels may be represented as pixels whose values are much larger or smaller than the range of the ordinary pixel value. An image frame signal from the frame memory 50 is then retrieved to a binary map detector 110 in the first encoding channel 100 and a block generator 200.

The first encoding channel 100, which includes the binary map detector 110 and a binary map coder 120, serves to detect and encode a binary map of the image signal from the frame memory 50 by employing a known coding technique to produce an encoded binary map. The binary map is made to include as many binary pixels as the number of pixels in the image frame signal wherein each binary pixel value is decided according to whether a corresponding pixel of the image frame signal is an object pixel or a background pixel.

The binary map detected at the binary map detector 110 is then provided to the binary map coder 120 for the encoding thereof and also fed to the E/I device 400 of the present invention via a line L10.

At the binary map coder 120, the binary map from the binary map detector 110 is encoded by using, e.g., a binary arithmetic code of JPEG (Joint Photographic Experts Group) and then the encoded binary map is supplied to a formatting circuit 600.

In the meantime, the block generator 200 divides the image frame signal from the frame memory 50 into a multiplicity of processing blocks having an identical size of N×N pixels, N being a positive integer, and provides the processing blocks to a switching circuit 300 on a block-by-block basis. At the switching circuit 300, each of the processing blocks from the block generator 200 is selectively coupled to the E/I device 400 on a line L20 or the second encoding channel 500 in response to a control signal CS from a system controller(not shown). The system controller generates the control signal CS indicating whether or not a part of the object boundary in the image frame exists in each of the processing blocks. If the part of the object boundary exists in a processing block, i.e., the processing block has an object region and a background region simultaneously, the processing block is coupled to the E/I device 400 for generating an extended processing block; otherwise, it is sent to the second encoding channel 500.

In accordance with the present invention, the E/I device 400 alters each of the processing blocks from the switching circuit 300 into an extended processing block to improve a data compression efficiency at the second encoding channel 500. The processing block fed to the E/I device 400 is similar to the one shown in FIG. 2A and modified therein to the extended processing block as explained with reference to FIGS. 2A to 2C. The detailed description of the E/I device 400 will be given with reference to FIG. 4.

The second encoding channel 500, which includes a transform coder 510, a quantizer 520 and an entropy coder 530, serves to encode the image data included in each of the extended processing blocks from the E/I device 400 or non-extended processing blocks from the switching circuit 300 by using a conventional transform and statistical coding technique. That is, the transform coder 510 transforms the image data of each processing block in the spatial domain from the E/I device 400 or the switching circuit 300 into a set of transform coefficients in the frequency domain by employing, e.g., a discrete cosine transform(DCT) and provides the set of the transform coefficients to the quantizer 520. At the quantizer 520, the set of the transform coefficients is quantized by using a known quantization method; and then the set of quantized transform coefficients is fed to the entropy coder 530 for further processing.

The entropy coder 530 encodes the set of quantized transform coefficients from the quantizer 520 for each of the non-extended or extended processing blocks by using, e.g., a combination of run-length and variable length coding to generate an encoded image signal. The image signal encoded by the entropy coder 530 is then provided to the formatting circuit 600.

The formatting circuit 600 formats the encoded binary map from the binary map coder 120 in the first encoding channel 100 and the encoded image signal from the entropy coder 530 in the second encoding channel 500, to thereby provide a formatted digital image signal to a transmitter(not shown) for the transmission thereof.

Figure 4:
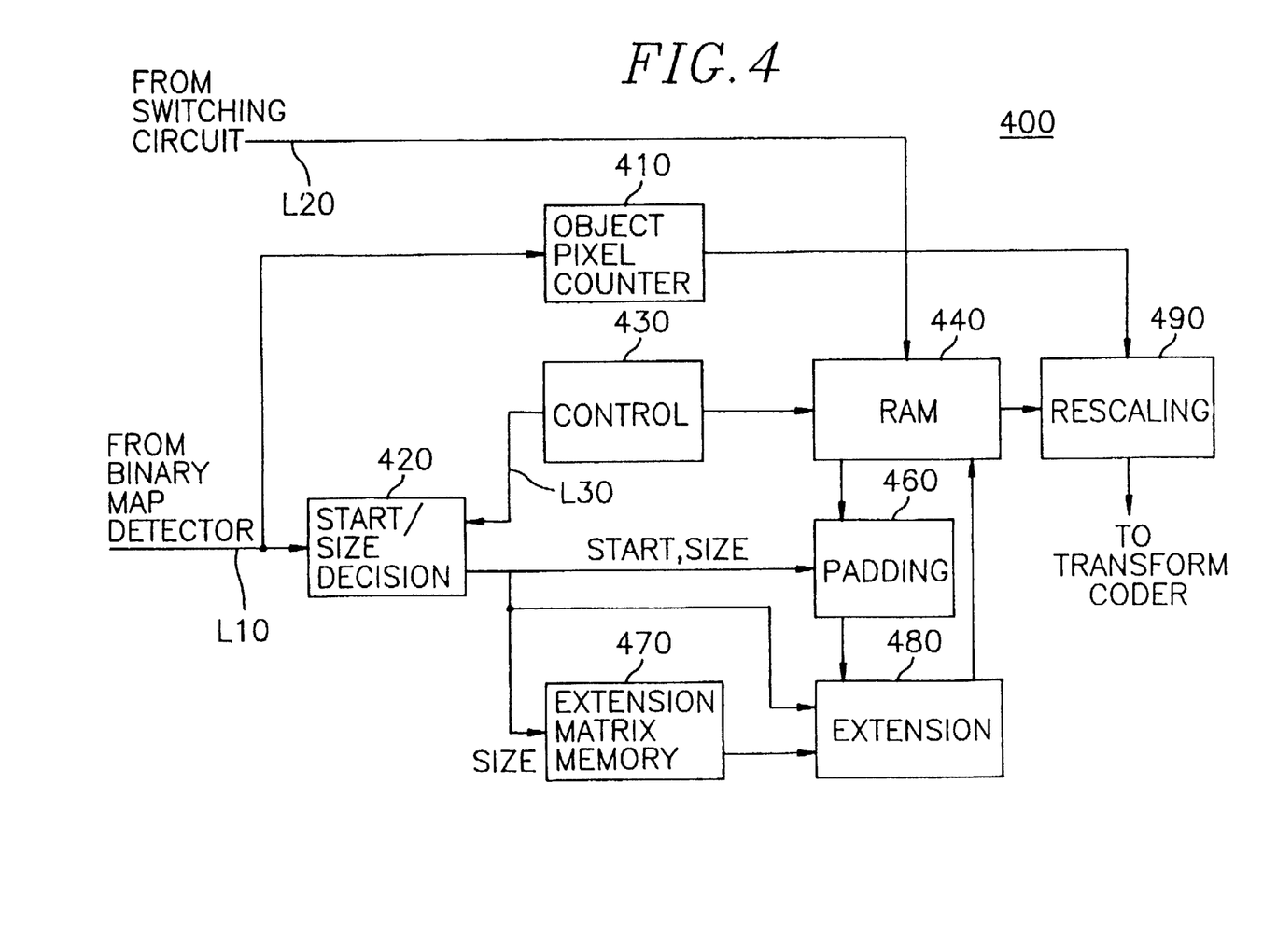
FIG. 4 offers a detailed block diagram of an extension-interpolation device shown in FIG. 3.

Referring to FIG. 4, there is shown a detailed block diagram of the E/I device 400 shown in FIG. 3 in accordance with the present invention. The E/I device 400 includes an object pixel counter 410, a start/size decision block 420, a control block 430, a RAM (random access memory) 440, a padding block 460, an extension matrix memory 470, an extension block 480 and a rescaling block 490.

The processing block from the switching circuit 300 shown in FIG. 3 is inputted to the RAM 440 on the line L20 and stored therein. The binary map from the binary map detector 110 shown in FIG. 3 is coupled to the object pixel counter 410 and the start/size decision block 420 on the line L10.

At the object pixel counter 410, the total number of object pixels in each processing block is counted in response to the binary map, and provided to the resealing block 490.

At the start/size decision block 420, a size and a start signals are determined in response to the binary map wherein the size signal denotes the number of object pixels in a currently processed row or column of the processing block, and the start signal represents the position of a first object pixel in the currently processed row or column. The start and the size signals are supplied to the padding block 460 and the size signal is fed to the extension matrix memory 470 and to the extension block 480.

The detailed description of the start/size decision block 420 will now be given in conjunction with the example shown in FIGS. 2A to 2C. When there is no object pixel in the current row as is the case with the first two rows of the processing block shown in FIG. 2A, the size signal are made to indicate to the padding block 460, the extension matrix memory 470 and the extension block 480 that the row does not have to be processed by the extension-interpolation procedure of the present invention. In case of the third row of the processing block shown in FIG. 2A, the start signal indicates that the third pixel is the first object pixel and the size signal denotes that 5 object pixels are included in the row.

During the vertical extension, the start and the size signals are fixed to, e.g., 3 and 6, respectively, because the start position and the number of the object pixels in each column of the horizontally extended block are identical as shown in FIG. 2B.

The extension matrix memory 470 stores extension matrices, i.e., C in Eq. (5B), for transforming an M-D vector to an N-D vector in accordance with the present invention. N is preset according to a system design and is 8 in many cases. Therefore, it is possible to precalculate the extension matrix C for all values of M, i.e., 1 to N−1 and to store them at the extension matrix memory 470, and, therefore, the extension matrix memory 470 may be implemented with a ROM (Read Only Memory). The extension-interpolation for a row (or a column) of the processing block can be easily done by multiplying an appropriate extension matrix stored at the extension matrix memory 470 to the M-D vector formed with values of the object pixels in the row (or the column). The appropriate extension matrix is selected in response to the size signal and provided to the extension block 480 for the multiplication. In case the size signal indicates that there is no object pixel in a current row (or a column), no extension matrix is selected and provided to the extension block 480.

Meanwhile, at the control block 430, a H/V signal and a row/column number signal are formed wherein the H/V signal denotes whether a horizontal or a vertical extension is currently performed at the E/I device of the present invention and the row/column number signal represents a row or a column which is currently processed at the E/I device 400 of the present invention. As usual, rows/columns in a block are sequentially processed, and, therefore, the signal is predetermined according to a system design, e.g., the numbers of rows and columns in a processing block. The H/V signal and the row/column number signal are fed to the start/size decision block 420 and the RAM 440.

As mentioned above, the processing block from the switching circuit 300 shown in FIG. 3 is fed to the RAM 440. Rows or columns of the processing block are sequentially provided from the RAM 440 in response to the H/V signal and the row/column number signal from the control block 430. For the purpose of illustration, it will be assumed that the horizontal extension is performed first. In this case, each row of the processing block is first provided to the padding block 460.

At the padding block 460, in response to the start and the size signals, an M-D vector representing the object pixel values included in the row provided from the RAM 440 is formed and is supplied to the extension block 480. The M-D vector is formed by selecting M consecutive object pixels starting from the position denoted by the start signal.

In response to the size signal, or in other words, the M-value signal, an extension matrix is selected among a plurality of predetermined extension matrices stored at the extension matrix memory 470 and provided therefrom to the extension block 480. The extension matrix is multiplied to the M-D vector at the extension block 480 to form an extended N-D vector. The N-D vector or a horizontally extended row is fed back to the RAM 440 and stored where the original row was located.

As described above, a row of the processing block stored at the RAM 440 is converted to the horizontally extended row and stored back. All rows of the processing block are processed in the same manner except the row having no object pixel. In this case, the size signal indicates to the extension block 480 that there is no object pixel in the row so that a multiplication is not performed therein and the original data at the RAM 440 remains unchanged.

It can be deduced that by the time the horizontal extension is completed, a horizontally extended processing block similar to the one shown in FIG. 2B, which includes extended rows, is stored at the RAM 440.

After the horizontal extension is finished, the columns of the horizontally extended processing block are sequentially provided from the RAM 440 to the padding block 460 in response to the H/V signal and the row/column number signal from the control block 430. Except that, the functions of the padding block 460, the extension matrix memory 470 and the extension block 480 are substantially the same with those of the horizontal extension. Specifically, the M-D vector formed from each column of the horizontally extended processing block is provided from the padding block 460 to the extension block 480 and converted to the N-D vector therein. The extended column (or the N-D vector) is fed to the RAM 440 and stored at the position where the corresponding column of the horizontally extended block was located.

After the horizontal and the vertical extensions are completed, the extended processing block stored at the RAM 440 is coupled to the resealing block 490. At the resealing block 490, each pixel value of the extended processing block is scaled down by using the block scaling factor which is determined in response to the number of object pixels in a processing block provided from the object pixel counter 410.

The rescaled extended processing block is coupled to the transform coder 510 of the second encoding channel 500 shown in FIG. 3 and encoded therein.

As demonstrated above, the apparatus of the present invention is capable of considerably reducing high frequency components present between the pixels within an object and those pixels outside thereof during the block transformation coding process, by using the E-I method, thereby improving the overall coding efficiency.

While the present invention has been described with respect to the particular embodiments, it will be apparent to those skilled in the art that various changes and modifications may be made without departing from the spirit and scope of the invention as defined in the following claims.

What is claimed is:

1. A method for converting a processing block included in an image frame signal having an object to an extended processing block, wherein the processing block consists of N×N pixels which are classified into object pixels and background pixels, N being a positive integer, the object pixels being located within the object and the background pixel being located outside the object, comprising the steps of:

(A) selecting L rows of the processing block, each of the L rows having at least one object pixels, L being an integer ranging from 0 to N;

(B) for each row selected at step (A), determining M representing a number of object pixels included in said each row and providing a first vector, each element of the first vector being a value of each of the M object pixels included in said each row, M being an integer ranging from 1 to N;

(C) for said each row, choosing an extension matrix among a multiplicity of predetermined extension matrices, based on the M and N values and multiplying the chosen extension matrix to the first vector to provide an extended first vector;

(D) providing a first extended processing block which includes L rows, each row having N pixels whose values are elements of each of the extended first vectors;

(E) for each column of the first extended processing block, providing an L-dimensional second vector, elements of the second vector being values of pixels included in said each column of the first extended processing block;

(F) choosing an extension matrix among a multiplicity of the predetermined extension matrices based on the L and N values;

(G) multiplying the extension matrix chosen at step (F) to each of the second vectors, to provide N extended second vectors and to thereby provide second extended processing block which includes N columns, each column having N pixels whose values are elements of each of the extended second vectors;

(H) counting the number of the object pixels in the processing block and determining a block scaling factor which is the number of the object pixels divided by the number of pixels in the processing block; and (I) multiplying the block scaling factor to each pixels of the second extended processing block, to thereby provide the extended processing block.

2. The method of claim 1, wherein the extension matrix for converting an M-dimensional vector to an N-dimensional vector is determined as:

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & & \cdot & & \cdot \\ \cdot & \cdot & & \cdot & & \cdot \\ a_{(M-1)0} & a_{(M-1)1} & \cdots & a_{(M-1)(M-1)} & \cdots & a_{(M-1)(N-1)} \\ \cdot & \cdot & & \cdot & & \cdot \\ \cdot & \cdot & & \cdot & & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ \mu_0 b_{10} & \mu_0 b_{11} & \cdots & \mu_0 b_{1(M-1)} \\ \cdot & \cdot & & \cdot \\ \cdot & \cdot & & \cdot \\ \mu_0 b_{(M-1)0} & \mu_0 b_{(M-1)1} & \cdots & \mu_0 b_{(M-1)(M-1)} \\ 0 & 0 & \cdots & 0 \\ \cdot & \cdot & & \cdot \\ \cdot & \cdot & & \cdot \\ 0 & 0 & \cdots & 0 \end{pmatrix}$$

wherein $a_{ij}$ is represented as $$\sqrt{\frac{2}{N+1}} \sin\left[\frac{\pi(j+1)(i+1)}{N+1}\right],$$

$b_{ij}$ is represented as $$\sqrt{\frac{2}{M+1}} \sin\left[\frac{\pi(j+1)(i+1)}{M+1}\right]$$

and $\mu_0$ is given as $$\mu_0 = \sqrt{\frac{N}{M}},$$

respectively.

3. The method of claim 1, wherein the extension matrix for converting an M-dimensional vector to an N-dimensional extended vector is determined as:

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & & \cdot & & \cdot \\ \cdot & \cdot & & \cdot & & \cdot \\ a_{(M-1)0} & a_{(M-1)1} & \cdots & a_{(M-1)(M-1)} & \cdots & a_{(M-1)(N-1)} \\ \cdot & \cdot & & \cdot & & \cdot \\ \cdot & \cdot & & \cdot & & \cdot \\ a_{(N-1)0} & a_{(N-1)1} & \cdots & a_{(N-1)(M-1)} & \cdots & a_{(N-1)(N-1)} \end{pmatrix}^{-1}$$

-continued $$\begin{pmatrix} \mu_0 b_{00} & \mu_0 b_{01} & \cdots & \mu_0 b_{0(M-1)} \\ \mu_0 b_{10} & \mu_0 b_{11} & \cdots & \mu_0 b_{1(M-1)} \\ \cdot & \cdot & \cdot & \cdot \\ \cdot & \cdot & \cdot & \cdot \\ \cdot & \cdot & \cdot & \cdot \\ \mu_0 b_{(M-1)0} & \mu_0 b_{(M-1)1} & \cdots & \mu_0 b_{(M-1)(M-1)} \\ 0 & 0 & \cdots & 0 \\ \cdot & \cdot & \cdot & \cdot \\ \cdot & \cdot & \cdot & \cdot \\ \cdot & \cdot & \cdot & \cdot \\ 0 & 0 & \cdots & 0 \end{pmatrix}$$

wherein $b_{ij}$ is represented as $$\sqrt{\frac{1}{M}} \quad \text{for } i = 0$$

$$\sqrt{\frac{2}{M}} \cos\left[\frac{\pi(2j+1)i}{2M}\right] \quad \text{for } i \neq 0,$$

$a_{ij}$ is represented as $$\sqrt{\frac{1}{N}} \quad \text{for } i = 0$$

$$\sqrt{\frac{2}{N}} \cos\left[\frac{\pi(2j+1)i}{2N}\right] \quad \text{for } i \neq 0$$

and $\mu_0$ is given as $$\mu_0 = \sqrt{\frac{N}{M}},$$

respectively.

4. A method for converting a processing block included in an image frame signal having an object to an extended processing block, wherein the processing block consists of N×N pixels which are classified into object pixels and background pixels, N being a positive integer, the object pixels being located within the object and the background pixels being located outside the object, comprising the steps of:

(A) selecting L rows of the processing block, each of the L rows having at least one object pixel, L being an integer ranging from 0 to N;

(B) for each row selected at step (A), determining M representing a number of object pixels included in said each row and providing a first vector, each element of the first vector being a value of each of the M object pixels included in said each row, M being an integer ranging from 1 to N;

(C) for said each row, choosing an extension matrix among a multiplicity of predetermined extension matrices, based on the M and N values and multiplying the chosen extension matrix to the first vector to provide an extended first vector;

(D) providing a first extended processing block which includes L rows, each row having N pixels whose values are elements of each of the extended first vectors;

(E) for each column of the first extended processing block, providing an L-dimensional second vector, elements of the second vector being values of pixels included in said each column of the first extended processing block;

(F) choosing an extension matrix among a multiplicity of the predetermined extension matrices based on the L and N values;

(G) multiplying the extension matrix chosen at step (F) to each of the second vectors, to provide N extended second vectors and to thereby provide the extended processing block which includes N columns, each column having N pixels whose values are elements of each of the extended second vectors, wherein the extension matrix for converting an M-dimensional vector to an N-dimensional vector is determined as:

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(M-1)0} & a_{(M-1)1} & \cdots & a_{(M-1)(M-1)} & \cdots & a_{(M-1)(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & \cdot & \cdot \\ \cdot & \cdot & \cdot & \cdot \\ \cdot & \cdot & \cdot & \cdot \\ b_{(M-1)0} & b_{(M-1)1} & \cdots & b_{(M-1)(M-1)} \\ 0 & 0 & \cdots & 0 \\ \cdot & \cdot & \cdot & \cdot \\ \cdot & \cdot & \cdot & \cdot \\ 0 & 0 & \cdots & 0 \end{pmatrix}$$

wherein $a_{ij}$ is represented as $$\sqrt{\frac{2}{N+1}} \sin\left[\frac{\pi(j+1)(i+1)}{N+1}\right],$$

$b_{ij}$ is represented as $$\sqrt{\frac{2}{M+1}} \sin\left[\frac{\pi(j+1)(i+1)}{M+1}\right]$$

and $\mu_0$ is given as $$\mu_0 = \sqrt{\frac{N}{M}},$$

respectively.

5. An apparatus for encoding an image frame signal having an object, wherein the image frame signal consists of object pixels and background pixels, the object pixels being located within the object and the background pixels being located outside the object, said apparatus including:

(A) means for detecting a binary map indicating that which of the pixels in the image frame signal are object pixels;

(B) means for encoding the binary map to generate a first encoded image frame signal;

(C) means for dividing the image frame into a plurality of processing blocks, each of the processing blocks having N×N pixels, N being a positive integer;

(D) means for generating a control signal indicating whether or not each of the processing blocks has both object pixels and background pixels;

(E) means for dividing the processing blocks to a first and a second sets of processing blocks in response to the control signal, wherein each of the processing blocks of the first set has both object pixel and background pixel;

(F) means for converting each processing block of the first set to an extended processing block;

(G) means for encoding the extended processing blocks or the second set of processing blocks, to thereby produce a second encoded image frame signal; and (H) means for formatting the first and the second encoded image signals, wherein said means for converting each processing block comprises:

(F1) means for selecting L rows of said processing block, each of the L rows having at least one object pixels, L being an integer ranging from 0 to N;

(F2) means, for each row selected at means for selecting, for determining M representing a number of object pixels included in said each row and providing a first vector, each element of the first vector being a value of each of the M object pixels included in said each row, M being an integer ranging from 1 to N;

(F3) means, for said each row, for choosing an extension matrix among a multiplicity of predetermined extension matrices, based on the M and N values and multiplying the chosen extension matrix to the first vector to provide an extended first vector wherein the extension matrix for converting an M-dimensional vector to an N-dimensional vector is determined as:

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(M-1)0} & a_{(M-1)1} & \cdots & a_{(M-1)(M-1)} & \cdots & a_{(M-1)(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(N-1)0} & a_{(N-1)1} & \cdots & a_{(N-1)(M-1)} & \cdots & a_{(N-1)(N-1)} \end{pmatrix}^{-1}$$

-continued $$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & \cdot & \cdot \\ \cdot & \cdot & \cdot & \cdot \\ \cdot & \cdot & \cdot & \cdot \\ b_{(M-1)0} & b_{(M-1)1} & \cdots & b_{(M-1)(M-1)} \\ 0 & 0 & \cdots & 0 \\ \cdot & \cdot & \cdot & \cdot \\ \cdot & \cdot & \cdot & \cdot \\ \cdot & \cdot & \cdot & \cdot \\ 0 & 0 & \cdots & 0 \end{pmatrix}$$

wherein $a_{ij}$ is represented as $$\sqrt{\frac{2}{N+1}} \sin\left[\frac{\pi(j+1)(i+1)}{N+1}\right],$$

$b_{ij}$ is represented as $$\sqrt{\frac{2}{M+1}} \sin\left[\frac{\pi(j+1)(i+1)}{M+1}\right]$$

and $\mu_0$ is given as $$\mu_0 = \sqrt{\frac{N}{M}},$$

respectively;

(F4) means for providing a first extended processing block which includes L rows, each row having N pixels whose values are elements of each of the extended first vectors;

(F5) means, for each column of the first extended processing block, for providing an L-dimensional second vector, elements of the second vector being values of pixels included in said each column of the first extended processing block;

(F6) first means for choosing an extension matrix among a multiplicity of the predetermined extension matrices based on the L and N values; and (F7) means for multiplying the extension matrix chosen at said first means for choosing to each of the second vectors, to provide N extended second vectors and to thereby provide the extended processing block which includes N columns, each column having N pixels whose values are elements of each of the extended second vectors.

* * * * *